US007210574B2

(12) United States Patent
Resch et al.

(10) Patent No.: US 7,210,574 B2
(45) Date of Patent: May 1, 2007

(54) PASTA DRYER

(75) Inventors: Heinz Resch, Flawill (CH); Hermann Zwyssig, Niederuzwill (CH)

(73) Assignee: Buehler AG, Uzwil (CH)

(*) Notice: Subject to any disclaimer, the term of this patent is extended or adjusted under 35 U.S.C. 154(b) by 0 days.

(21) Appl. No.: 10/508,513

(22) PCT Filed: Mar. 18, 2003

(86) PCT No.: PCT/CH03/00176

§ 371 (c)(1),
(2), (4) Date: Mar. 14, 2005

(87) PCT Pub. No.: WO03/098139

PCT Pub. Date: Nov. 27, 2003

(65) Prior Publication Data

US 2005/0150129 A1 Jul. 14, 2005

(30) Foreign Application Priority Data

May 17, 2002 (DE) ................................ 102 22 548

(51) Int. Cl.
*B65G 17/06* (2006.01)

(52) U.S. Cl. ....................... 198/851; 34/207; 99/443 C

(58) Field of Classification Search ................ 198/850, 198/851, 853; 34/207; 99/443 C
See application file for complete search history.

(56) References Cited

U.S. PATENT DOCUMENTS 1,327,486 A 1/1920 McIntyre
3,759,369 A * 9/1973 Vering et al. ............... 198/560
4,344,524 A 8/1982 Falck et al.
4,366,628 A 1/1983 George
4,542,821 A 9/1985 Livermore
5,425,959 A * 6/1995 Manser ........................ 426/231
5,456,931 A * 10/1995 Egger et al. ................ 426/458

FOREIGN PATENT DOCUMENTS

| | | | | |
|---|---|---|---|---|
| CH | 414 465 | | 5/1966 | |
| CH | 662799 | A * | 10/1987 | ................ 198/822 |
| DE | 976 146 | | 3/1963 | |
| DE | 15 56 531 | | 1/1970 | |
| DE | 21 09 948 | | 10/1972 | |
| DE | 31 39 952 | | 5/1982 | |
| DE | 39 13 576 | | 10/1990 | |
| NL | 93 495 | | 2/1960 | |
| WO | 85/00090 | | 1/1985 | |
| WO | 92/17074 | | 10/1992 | |
| WO | 93/17583 | | 9/1993 | |

* cited by examiner

*Primary Examiner*—Mark A. Deuble
(74) *Attorney, Agent, or Firm*—Jordan and Hamburg LLP

(57) ABSTRACT

A pasta dryer comprising a conveyer belt for conveying and delivering dried pasta, the conveyor belt being configured as a continuous conveyor. To operate more efficiently, the conveyor belt has a delivery table in the vicinity of an idler, the table comprising an attached fixed or sliding product collection tray. The reinforcement elements of the conveyor belt are preferably S-shaped.

6 Claims, 1 Drawing Sheet

PASTA DRYER

BACKGROUND OF THE INVENTION

The invention relates to a pasta dryer with a conveyor belt for conveying and depositing dried pasta, as well as short goods and long goods.

Pasta dryers are adequately known for long as well as for short pastas as described, for example, in WO 85/00090 or WO 93/17583. Methods, suitable for drying and stabilizing pasta itself are also known (for example, WO 92/17074).

The WO 93/17583 also discloses a method and equipment for producing long pasta, especially lasagna. By these means, the dried lasagna is placed on an endless pocket conveyor belt and cut as it passes through continuously. From the lower strand of the conveyor belt, the cut lasagna reaches chutes and subsequently a packaging conveyor or a package.

SUMMARY OF THE INVENTION

It is an object of the invention to construct a pasta dryer for pasta, by means of which the conveyor belt is operated more efficiently.

A depositing table is provided in the area of the sprocket the wheel underneath the upper strand of the conveyor belt, preferably an endless conveyor belt. A product collection dish or a drawer, which can be pulled out and into which the pasta on the conveyor belt can fall, preferably adjoins this depositing table. Contamination of the pasta, which is to be dried, or of the pasta dryer is avoided by these means.

With that, pasta, falling down from the upper strand, is collected selectively. The pasta in question has especially a small format. It falls on the depositing table and not into the conveyor belt, etc., and cannot contaminate the lower strand and contaminated pasta is also not carried along. Even pasta, falling onto the lower strand or located there reaches the depositing table in the course of the further movement of the conveyor belt.

The reinforcing elements, forming pockets, are constructed in such a manner that they are S-shaped or blade-shaped in order to ensure that the pasta is carried along reliably from the depositing table in to the drawer.

The invention is described in greater detail in an example by means of a drawing.

BRIEF DESCRIPTION OF THE DRAWING

The single FIGURE shows the deflection region of an endless conveyor belt.

DESCRIPTION OF THE PREFERRED EMBODIMENTS

Figure 1:
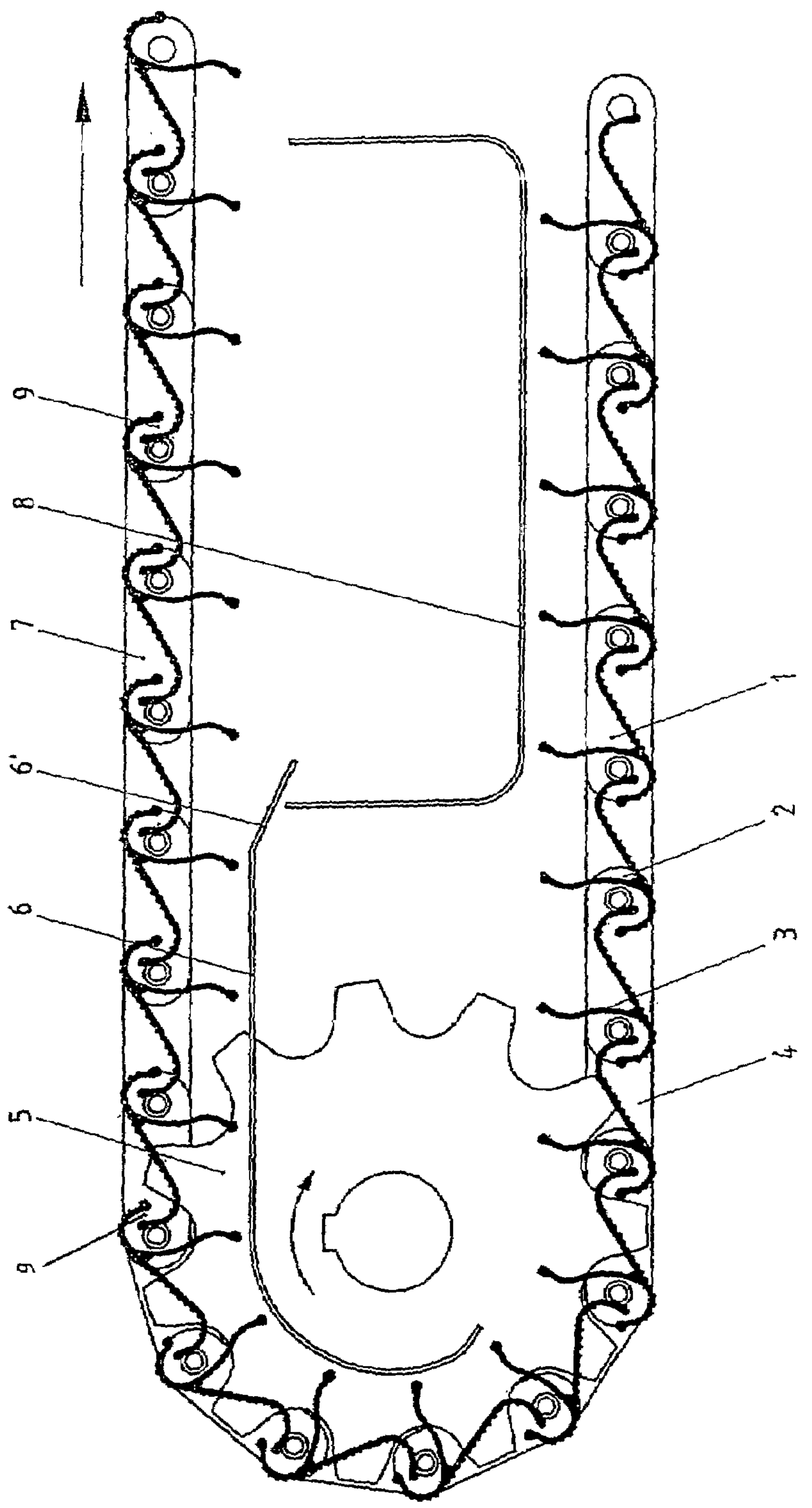

After it has left the pasta press, which is not shown, short pasta is transferred to an endless conveyor belt 1, so that it may be dried in the dryer. The conveyor belt 1 is guided between two sprocket wheels. The pasta, which is to be dried or conveyed, is deposited on the conveyor belt 1 in the area of a depositing table 6. Due to the air flowing, it may happen that small parts fall through the air gap 9 between the conveyor belt 1 and, in the lower strand, during the deflection, circulate around the shaft of the sprocket wheels due to the reinforcing elements 3. On the inside of the conveyor belt, the reinforcing elements 3 form the pockets 2, which permit the product parts, lying in the interior, to be conveyed.

The endless conveyor belt 1 is deflected by the sprocket wheels and pasta, falling out of the pockets 2, falls on the depositing table 6, which is disposed below the upper strand 7. Adjoining the depositing table 6, there is a product collection dish 8, which optionally can be pulled out.

The depositing table 8 is extended arc-shaped in the direction of the lower strand 4 and forms an arc of at least 90° in this region. The arc is to be extended at least so far, that pieces of pasta, forming out, reach the depositing table 6 reliably. The end of the arc is angled in the direction of the axis of rotation of the tensioning wheel 5 that is shown. The other end (6') of the depositing table 6 is also angled in the direction of the lower strand 4 to such an extent, that the end protrudes into the drawer 8. By these means, pasta can be discharged from the depositing table 6 into the product-collection dish 8. Such pasta, which adheres to the reinforcing elements 3 or could be in the pockets of the lower strand 4, also reaches the product collection dish 8 in this manner.

Alternatively, instead of the arc, the depositing table 6 could also be angled at right angles to the direction of the lower strand 4. This has the advantage that the plane of the depositing table 6 can be placed as far as possible into the deflection region of the conveyor belt 1. With that, product can be collected as early as possible.

The reinforcing elements 3 are bent S-shaped, the lower end being directed opposite to the conveying direction in order to avoid any interlocking or the like. The distance between the lower end of the reinforcing elements 3 and the depositing table 6 (including the arc) should be as small as possible, in order to ensure that the pasta is carried along completely.

| List of Reference Symbols | |
|---|---|
| 1 | conveyor belt |
| 2 | pocket |
| 3 | reinforcing element |
| 4 | lower strand |
| 5 | tensioning wheel |
| 6 | depositing table |
| 6' | end |
| 7 | upper strand |
| 8 | product-collection dish |
| 9 | air gap |

The invention claimed is:

1. A system for conveying and delivering pasta dried in a pasta dryer, comprising:

sprocket wheels;

a conveyor belt being guided by and deflected about said sprocket wheels such that said conveyer belt includes an upper strand and a lower strand;

reinforcing elements being disposed in a spaced apart orientation on the conveyer belt and arranged to face inwardly thereof forming pockets therebetween for receiving and holding the pasta therein as the pasta is conveyed along the lower strand; and a depositing table being disposed underneath said upper strand in an area proximate to a one of said sprocket wheels at which said pasta has already been dried in the pasta drier, said depositing table including a flat depositing surface which is extended along an arc in direction of the lower strand, such that during deflection of the conveyer belt from the lower strand to the upper stand about said one of said sprocket wheels, the pasta in the pockets falls onto the depositing table.

2. A system according to claim 1, wherein the depositing table is angled inward at an end of the arc.

3. A system according to claim 1, wherein the arc is at least 90°.

4. A system according to claim 1, wherein an end of the depositing table opposite said arc is bent in direction of said lower strand.

5. A system according to claim 1, wherein the reinforcing elements are constructed S-shaped or blade-shaped.

6. A system according to claim 4, further comprising a product collection dish being disposed underneath the upper strand in such a manner that said end of the depositing table, which is angled, extends into said collection dish.

* * * * *